United States Patent
Kuperman et al.

(10) Patent No.: US 10,218,810 B2
(45) Date of Patent: *Feb. 26, 2019

(54) DYNAMIC CONTENT CACHING SYSTEM

(71) Applicant: Zenedge, Inc., Los Angeles, CA (US)

(72) Inventors: Leon Kuperman, Tarzana, CA (US); Kipras Mancevičius, Kaunas (LT); Dmytro Bekinin, Kiev (UA)

(73) Assignee: ZENEDGE, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,378

(22) Filed: Dec. 28, 2017

(65) Prior Publication Data

US 2018/0124201 A1 May 3, 2018

Related U.S. Application Data

(63) Continuation of application No. 14/975,505, filed on Dec. 18, 2015, now Pat. No. 9,860,334.

(60) Provisional application No. 62/095,761, filed on Dec. 22, 2014.

(51) Int. Cl.
*G06F 15/16* (2006.01)
*H04L 29/08* (2006.01)
*G06F 17/30* (2006.01)

(52) U.S. Cl.
CPC .... *H04L 67/2842* (2013.01); *G06F 17/30902* (2013.01); *H04L 67/02* (2013.01)

(58) Field of Classification Search
CPC ........ H04L 29/08801–29/08837; H04L 67/02; H04L 67/2842–67/2857; G06F 17/30902–17/30905
See application file for complete search history.

(56) References Cited

U.S. PATENT DOCUMENTS

| | | | | |
|---|---|---|---|---|
| 6,185,608 B1 * | 2/2001 | Hon | ................. | G06F 17/30902 707/999.01 |
| 6,850,975 B1 * | 2/2005 | Danneels | ............ | G06F 17/3089 707/E17.116 |
| 2003/0004998 A1 * | 1/2003 | Datta | ................ | G06F 17/30902 715/234 |
| 2004/0044731 A1 * | 3/2004 | Chen | ...................... | H04L 67/02 709/203 |

(Continued)

*Primary Examiner* — Brendan Y Higa
(74) *Attorney, Agent, or Firm* — Kraguljac Law Group, LLC

(57) ABSTRACT

A proxy server routes a request for online content from a user device to an origin server, which returns the requested online content to the proxy server. The proxy server passes the online content to the user device. In order to service subsequent user device requests with cached content, the proxy server, having received the initially requested online content from the origin server, parses out dynamic content specific to the user from static content common to many users within the web page content according to tags identifying the dynamic content. The proxy server stores the dynamic content within a personalized cache and also stores an association between the user/user device for the dynamic content stored. In this way, a subsequent request from the user device for the same online content may be serviced from cache, and include dynamic content specific to that user/user device by way of the personalized cache.

20 Claims, 12 Drawing Sheets

(56) References Cited

U.S. PATENT DOCUMENTS

2009/0049243 A1* 2/2009 Dubrovsky ....... G06F 17/30902 711/118
2012/0303697 A1* 11/2012 Alstad ............... G06F 17/30902 709/203
2013/0346475 A1* 12/2013 Jasperson ............... H04L 67/02 709/203

* cited by examiner

Edit Caching URL rule

Name
Name of caching rule
[Catalog]

Expire after
Set expire time for files
[10] [minutes ▼]

Browser expire after
Set browser expire time
[10] [minutes ▼]

URLs to be cached
URL [is ▼]   [           ]   [Add]
[URL starts with] /catalog   ⊙

[Save]   [Cancel]

DYNAMIC CONTENT CACHING SYSTEM

CROSS REFERENCE TO RELATED APPLICATIONS

This application is a continuation of U.S. Non-Provisional application Ser. No. 14/975,505, filed Dec. 18, 2015, which claims the benefit of U.S. Provisional Application No. 62/095,761, filed Dec. 22, 2014, all of which are incorporated by reference herein in their entirety

BACKGROUND

1. Field of Art

The disclosure generally relates to improving user experience on a network, and more specifically, to caching dynamic content specific to a user at the edge of a network to decrease loading times for web pages.

2. Description of the Related Art

Internet enabled user devices, such as smart phones, personal computers, tablets, gaming systems and the like have become prevalent in recent years. Given the proliferation of Internet enabled user devices and far-reaching Internet access, more and more users consume online content. As such, the location where a user accesses online content may be far removed from the origin of the content on the network.

With increasing distance between the origin of the content and access points from which user devices request the content, the time it takes to deliver data for providing the content to user devices increases. Additionally, in instances where a portion of the data to be delivered to a user device is lost and must be re-transmitted, the time it takes to provide the content increases further. As data delivery time increases, user experience on the Internet involving simple tasks such as browsing or loading webpages is degraded.

Some techniques have been implemented to reduce data delivery times for subsets of online content such as static content that remains the same for many users. Specifically, caches of static content frequently accessed by user devices are positioned at the "edges" of the network—or, in other words, copies of the static content are stored closer to one or more access points than the origin of the static content. Hence, in instances when the user device requests static content on the network where a copy of the static content is stored in a cache proximate to the access point utilized by the user device, the request may be serviced wholly from the cache absent communication with the origin server to reduce data delivery times. While this technique works well for delivering static content that remains the same for many users, caching dynamic content that is specific to a user presents additional challenges that affects delivery time.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

FIG. 5B illustrates an example user interface for specifying caching rules for a web page including tagged dynamic content, according to one embodiment.

DETAILED DESCRIPTION

Figure 1:
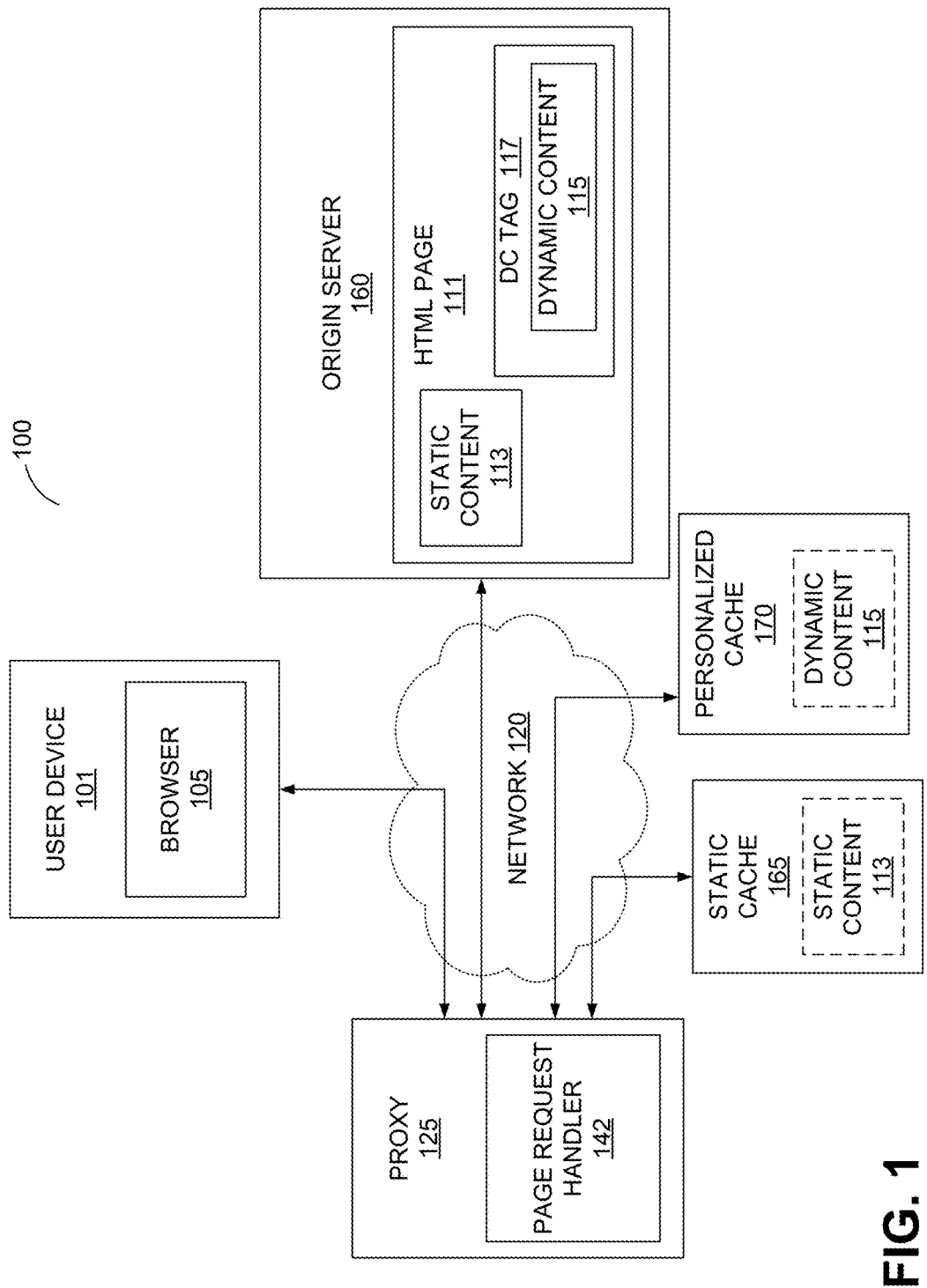
FIG. 1 illustrates a block diagram of an example communications environment for caching dynamic content specific to a user at the edge of a network, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A system (and method, and computer readable storage medium storing computer program instructions) is configured for servicing user requests for online content including tagged dynamic content on a network. The system comprises a proxy server that services user requests received from a user device for online content. The online content originates from an origin server and may include static content and dynamic content. An example of online content is a web page including images, text, audio, video, etc. Examples of static content include image, text, audio, video, etc. in a web page that are not user specific—such as those included in an article, gallery, homepage, etc. that are not personalized. Examples of dynamic content include images, text, audio, video, etc. in a web page that are user specific—such as those included in a shopping cart, targeted recommendation, targeted advertisement, and account information specific (or personalized) for the user on the web page. Dynamic content within the web page is wrapped with a dynamic content tag registered with the proxy server.

For an initial request of the online content received from the user device, because none of the requested online content can be identified in a cache, the proxy server requests the online content from the origin server. The proxy server receives a response from the origin server including the requested online content and returns the requested online content to the user device. In order to service subsequent requests with cached content, having retrieved the requested online content from the origin server the proxy server parses out tagged dynamic content within the online content and stores the dynamic content within a personalized cache while non-tagged static content within the online content may be stored within a static cache. A request identifier specific to the request is stored in association with the cached static content in the static cache. In some embodiments, the proxy server may store the request identifier locally and/or separate from the personalized cache such that the proxy server maintains a record of the cached static content. The request identifier references the cached static content with a request that would retrieve the cached static content from the origin server. Tag identifiers for the tagged dynamic content are stored in association with the cached dynamic content in the personalized cache. A user identifier specific to a user account and/or user device included in the request and/or response is stored in association with the cached dynamic content.

In some embodiments, the proxy server may store the user identifier in association the tag identifier locally and/or separate from the personalized cache such that the proxy server maintains a record of the cached dynamic content. The user identifier references the cached dynamic content with the user account and/or user device it is specific to. Example user identifiers may include one or more of a cookie name, cookie value, internet protocol (IP) address, media access control (MAC) address, etc. The tag identifier references the cached dynamic content within the online content from which it originated. For example, the tag identifier may include a tag ID or name and an associated expiration time and content area within the online content. One or more of these may be included in a single identifier.

For a subsequent request of the online content received from the user device, some or all of the requested online content may be identified in the static cache and/or the personalized cache. In one embodiment, the proxy server transmits the subsequent request to the static cache, which returns the cached static content referenced by the request for the online content. In other embodiments, the proxy server determines whether a request identifier exists for the request (i.e., static content for the request exists in the static cache), and then requests the cached static content referenced by the request identifier from the static cache. The cached static content includes one or more tag identifiers for the dynamic content within the requested online content. The subsequent request and/or cached static content includes one or more user identifiers. In one embodiment, the proxy server transmits the tag identifiers and user identifiers to the personalized cache, which returns the cached dynamic content referenced by the tag identifiers and the user identifiers. In other embodiments, the proxy server determines whether a tag identifier and user identifier association exists for the request (i.e., dynamic content for the request exists in the personalized cache), and then requests the cached dynamic content referenced by the tag identifier and user identifier from the personalized cache.

The proxy server merges the returned cached dynamic content with the returned cached static content to assemble a cached version of the online content requested by the user device. For example, the proxy server inserts, for each tag identifier in the cached static content, the cached dynamic content referenced by a given tag identifier and the user identifier to assemble the cached version of the online content. The proxy server then returns the cached version of the online content including both the cached static content and the cached dynamic content to the user device.

In some instances, for a subsequent request, the personalized cache may not wholly contain all the cached dynamic content necessary to fully assemble the requested online content. In other words, a first portion of the dynamic content necessary to fully assemble the requested online content may not exist in the personalized cache or be outdated while, for a second portion of the dynamic content there exists cached dynamic content in the personalized cache. For example, the first portion of the cached dynamic content may have expired based on the associated expiration time (and therefore purged from the personalized cache) or otherwise not exist in the personalized cache, in which case a recent version of the first portion of dynamic content needs to be retrieved from the origin server. In one embodiment, the first portion of the dynamic content for which cached dynamic content does not exist may be identified based on the personalized cache not delivering any cached content for a tag identifier and user identifier. In another embodiment, the first portion of the dynamic content for which cached dynamic content does not exist may be identified at the proxy server based on there being no stored tag identifier and user identifier association referencing cached dynamic content. In some embodiments, there may be a tag identifier and user identifier association referencing cached dynamic content, but an expiration time for the tag identifier may be exceeded, in which case the personalized cache does not return the cached dynamic content (because it has expired) or the proxy server does not request the cached dynamic content (because it has expired). In such cases, the cached dynamic content that has expired may be purged at this stage.

In response to determining that the requested online content cannot be fully assembled from cached content in the static cache and the personalized cache, the proxy server requests the online content from the origin server. In turn, the proxy server receives a response from the origin server including the requested online content. The proxy server parses out tagged dynamic content within the online content and stores the updated version of the dynamic content within the personalized cache.

Instead of waiting on the request/response operation above between the proxy server and the origin server to retrieve updated dynamic content, the proxy server returns a partially assembled cached version of the online content including the cached static content and the second portion of the dynamic content for which cached dynamic content exists to the user device. The partially assembled cached version of the online content may additionally include one or more placeholders merged with the partially assembled cached version of the online content in place of the first portion of dynamic content. For example, the proxy server inserts, for each tag identifier in the cached static content which references dynamic content in the first portion of dynamic content, a placeholder including code for initiating a placeholder request for an updated version of the dynamic content referenced by the tag identifier and user identifier. The placeholder additionally includes code for inserting the updated version of the dynamic content received in response to the placeholder request for display on a screen of the user device. The placeholder may additionally include a visual queue for display on the screen of the user device while the updated version of the dynamic content is being retrieved.

The proxy server may subsequently receive the placeholder request for the updated version of the dynamic content. The placeholder request includes the tag identifier and user identifier such that the proxy server may retrieve the referenced updated version of the cached dynamic content once it has been received from the origin server and stored in the personalized cache. In turn, the proxy server generates a placeholder response that includes the updated version of the cached dynamic content. Once the user device receives the updated version of the cached dynamic content for the placeholder, the updated version of the dynamic content is inserted for display on a screen of the user device.

The user may perform actions within received online content (including cached dynamic content) that invalidate the cached dynamic content. For example, the user may update account details, add or update an item in a shopping cart, etc. When the user performs an action within received online content, information about the action is received at the proxy server and passed to the origin server. The origin server performs whatever operations are necessary for the user and generates a response. The origin server further determines whether the action invalidated any dynamic content and includes one or more tag identifiers for the invalidated dynamic content and indicates that dynamic content is invalid in the response. In one embodiment, the proxy server receives the response and identifies whether the personalized cache includes dynamic content referenced by the tag identifiers for invalidated dynamic content in the response. In another embodiment, the proxy server forwards the response and/or tag identifiers and indicator that the tag identifiers reference invalidated dynamic content to the personalized cache. In either instance, if the personalized cache includes dynamic content referenced by the tag identifiers for invalidated dynamic content, the referenced dynamic content is purged from the personalized cache. Further, if the response from the origin server includes any tag references for dynamic content that is not invalidated, the proxy server caches that dynamic content in the personalized cache.

In another embodiment, a system (and method and computer readable storage medium storing computer program instructions) is configured for caching dynamic content on a network. The system comprises a proxy server that receives a tag registration request with a dynamic content caching service. For example, a developer console of a web page administrator may request to register a tag with the proxy server for caching dynamic content within the web page. The registration request may specify a tag identifier that uniquely identifies the tag, which the proxy server may verify as unique. In other embodiments, the proxy server may assign a unique tag identifier based on the request. In either instance, the proxy server stores the tag identifier. The proxy server may provide instructions and/or code to the developer console such that the web page administrator can wrap dynamic content within the web page with code including the tag identifier to create tagged dynamic content within the web page. Additionally, the proxy server may provide instructions and/or code to the developer consoled for including in responses (e.g., in a header) associated with changes to the tagged dynamic content, i.e., in the header of a response to an action that invalidates the dynamic content wrapped by the tag code. In turn, the proxy server may service a request from a user device for the web page and include tagged dynamic content within the web page that was cached in a personalized cache.

The proxy server retrieves available cached dynamic content that was tagged within the web page from the personalized cache. The cached dynamic content is merged with cached static content to assemble a cached version of the web page. For any tagged dynamic content within the web page that does not exist in the personalized cache or has expired (i.e., missing), placeholders that are inserted in the cached version of the web page for the missing dynamic content are configured to request updated dynamic content for the missing dynamic content and insert the updated dynamic content received from the proxy server at the user device to fill in the missing dynamic content. The cached version of the web page, which may include one or more placeholders, is provided to the user device. If any tagged dynamic content within the web page did not exist in the personalized cache, the proxy server fetches the web page from an origin server of the web page and parses out the tagged dynamic content to populate the personalized cache with updated dynamic content. The proxy server receives a placeholder request for the missing dynamic content from the user device and provides the updated dynamic content stored in the personalized cached referenced by the placeholder.

Dynamic Content Caching

Turning now to FIG. 1, it illustrates a block diagram of an example communications environment 100 for caching dynamic content specific to a user at the edge of a network 120, according to one embodiment. The environment 100 comprises user device 101, an origin server 160, a proxy server 125, a static cache 165, and a personalized cache 170.

The network 120 is a communication network that transmits data between the user device 101, the proxy server 125, static cache 165, personalized cache 170, and the origin server 160. In some embodiments, the proxy server 125, static cache 165, and personalized cache 170 are co-located. Additionally, the proxy server 125, static cache 165, and personalized cache 170 may be located at the edge of the network 120 such that they are more proximate to the user device 101 than the origin server 160. Embodiments may include many proxy servers 125 positioned at edges of the network 120 to service the many user devices 101 accessing the network 120 from different access points.

In one embodiment the network 120 includes wireless network and the Internet. The network 120 can also utilize dedicated or private communications links that are not necessarily part of the Internet. In one embodiment, the network 120 uses standard communications technologies and/or protocols. Thus, the network 120 can include links using technologies such as Ethernet, 802.11, integrated services digital network (ISDN), digital subscriber line (DSL), asynchronous transfer mode (ATM), etc. Similarly, the networking protocols used on the network 120 can include the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above. For example, wireless access points such as cellular towers may be utilized by the user device 101 to transmit and receive data over the 120 network. A service provider may implement and manage a wireless access point to provide authorized user devices 101 or users of the user devices 101 wireless access to the network through their paid service.

In one embodiment, the user device 101 is a computing device with network capabilities for consuming online content. Oftentimes, for example, the user device 101 is a wireless enabled mobile computing device configured to access the network 120 from wireless access points at edges of the network and may include applications for accessing online data. Example applications for accessing online data include applications such as a web browser 105 and media players that send/receive network data and present received data to the user. The user device 101 as mobile computing devices may include laptops, netbooks, tablets, smart telephones, or personal digital assistants (PDAs). The user device as a stationary computing device may include a desktop computer, media center, gaming system, or similar. While only one user device 101 is illustrated in FIG. 1, the environment 100 may include thousands or millions of such devices accessing the network 120 from various different access points. The applications such as a web browser 105 may be software applications running on the user device 101 for consuming content provided by the origin server 160. For example, the user device 101 may retrieve web content from the origin server 160 for presentation on a screen (or display) coupled to the user device. Communications between the user device 101 and the origin server 160 may pass through the proxy server 125.

The proxy server 125 may provide web content (e.g., web content from the origin server 160 that is stored in a cache) to the user device 101 instead of, or in addition to, the origin server 160. Thus, the proxy server 125 may service requests for online web content on the origin server 160 without involvement of the origin server 160. The user device 101 may also request content from the proxy server 125. For example, the proxy server 125 may insert a placeholder in online web content provided to the user device for online content not available in the cache, and retrieve the content not available in the cache from the origin server 160 for subsequent delivery to the user device 101. The placeholder causes the user device 101 to request the online content that was not available in the cache from the proxy server 125. Once the proxy server 125 has received and stored a copy of that online content in the cache separately, the proxy server 125 provides the online content that was originally not available to the user device 101. Web content accessed by the user device 101 may include text, images, audio and video content, such as those present in a web page. Multimedia web content can be played back by the browser 105, for example, by a HTML5 compatible browser itself, or alternatively via a plug-in or though a standalone media player. The browser 105 may also invoke the media players or plug-ins available on the user device 101 and pass images, audio and/or video to the media player or plug-in for playback.

The proxy server 125 may be a server, load balancer, or router located logically and/or physically between the user device 101 and the network 120 and/or origin server 160. Thus, the proxy server 125 manages the request/response path between the user device 101 and the origin server 160. For example, the proxy server 125 may provide the user device 101 with access to the network 120 and thus, provides the gateway through which the user device traffic flows onto the network 120 and vice versa. In one embodiment, the proxy server 125 includes logic for routing traffic between a particular user device and a particular origin server. In other words, the proxy server 125 directs traffic, such as a request for content, from the user device 101 to the appropriate destination, e.g., origin server 160, and directs traffic from the origin server 160, e.g., the content, to the appropriate destination, e.g., the user device 101 having requested the content. The proxy server 125 may also service user device 101 requests directly that request content included in a cache. Further, the proxy server 125 may also cache content directed to the user device 101 from the origin server 160 in order to service future requests of the user device 101 (and, in some instances, other user devices) directly for that same content.

As shown, the proxy server 125 interfaces with a static cache 165 and a personalized cache 170. When the proxy server 125 receives online content such as an HTML web page 111 from the origin service 160 in a response to a user device 101 request for the online content, the proxy server parses out dynamic content 115 within the page 111 that is wrapped with a dynamic content tag 117 from static content 113. The proxy server 125 stores the tagged 117 dynamic content 115 in the personalized cache 170. The proxy server 125 also stores the static content 113 within the static cache 165. The static content 113 within the static cache 165 may be referenced by a subsequent request for the page 111 to provide cached static content 113 to the user device 101 and/or additional user devices. The static content 113 may include one or more tags 117 referencing dynamic content 115 within the page 111. The dynamic content 115 within the personalized cache 170 may be referenced by the associated tag 117. Additionally, the dynamic content 115 may be referenced by an identifier for a user account (e.g., accessed through the user device 101) and/or the user device 101. The proxy server 125 receives the referenced cached static content 113 and the referenced dynamic content 115 and merges the cached content 113, 115 to assemble a cached version of the page 111 including the cached content, rather than fetching the HTML page 111 from the origin server 160. The proxy server 125 then provides the cached version of the page 111 to the user device 101.

In one embodiment, the proxy server 125 includes a page request handler 142 for routing traffic between the user device 101 and the origin server 160, caching online content provided from the origin server 160 to the proxy server for the user device 101, and servicing user device 101 requests for online content that is stored in the cache(s) 165 and/or 170. When the proxy server 125 receives a request from the user device 101 for online content, the proxy server 125 may service the request wholly or partially from the cache or forward the request to the origin server 160 to service the request. When the proxy service 125 can only partially service the request from the cache(s) 165 and/or 170, the proxy server 125 may provide available cached online content to the user device 101 and separately request the online content from the origin server 160 in order to retrieve the online content missing from the cache(s) 165 and/or 170. In turn, when the origin server 160 provides the online content to the proxy server 125, the proxy server 125 may provide the user device 101 with the missing portion. The page request handler 142 is described in more detail with reference to FIG. 4.

In some embodiments, the static cache 165 and the personalized cache 170 may be co-located. The static cache 165 and the personalized cache 170 may also be stored on a common storage medium, however are shown as separate for convenience of explanation.

Registering Dynamic Content

Figure 2:
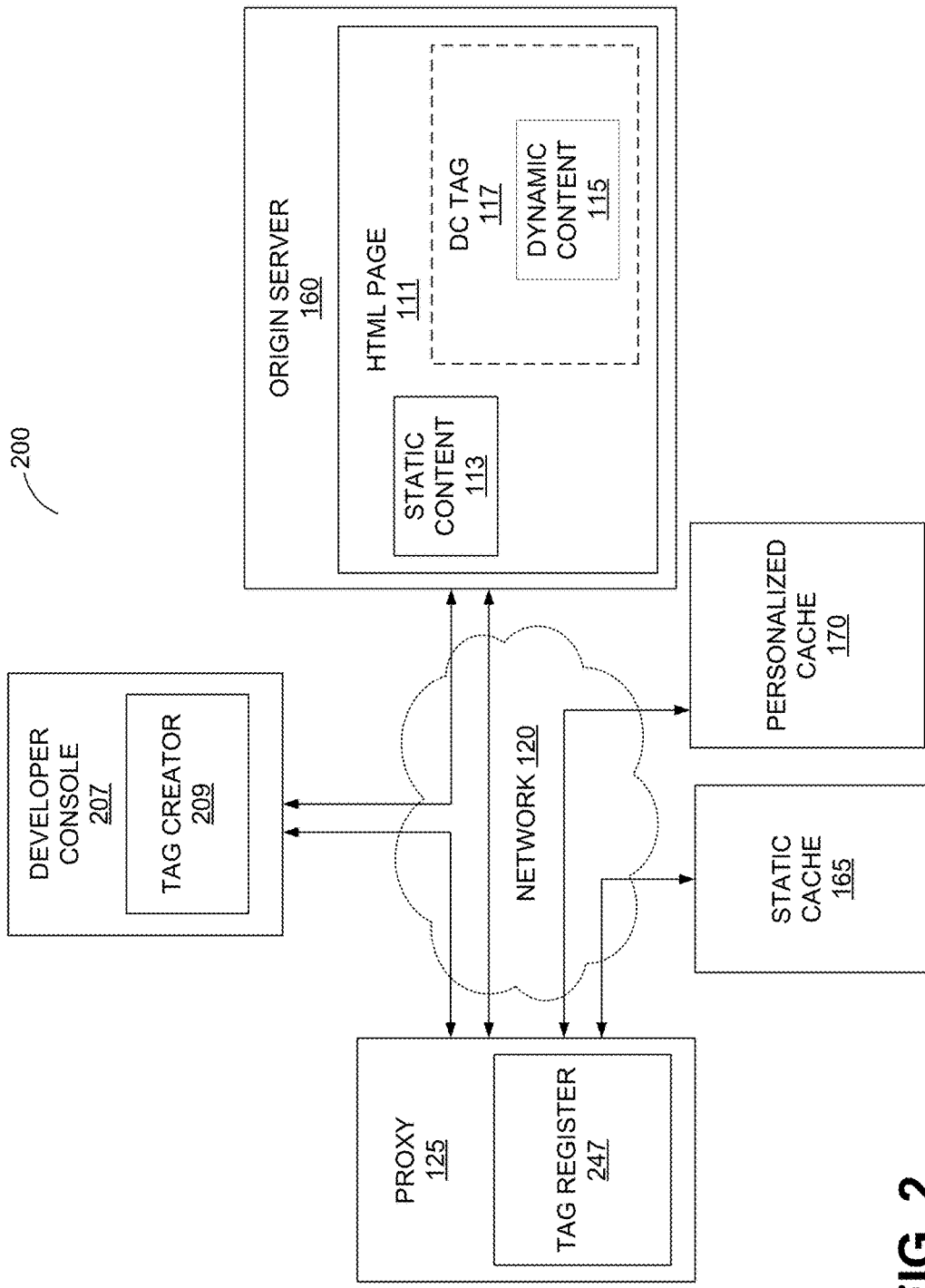
FIG. 2 illustrates a block diagram of an example communications environment for registering dynamic content for caching at the edge of a network, according to one embodiment.

FIG. 2 illustrates a block diagram of an example communications environment 200 for registering dynamic content for caching at the edge of a network 120, according to one embodiment. The environment 200 comprises developer console 207, an origin server 160, proxy server 125, a static cache 165, and a personalized cache 170.

Embodiments of the developer console 207 may be similar to the user device 101. In other words, the developer console 207 may be a computing device with access to the network 120. The developer console 207 further includes administration privileges for modifying online content on the origin server 160 such as static content 113 and dynamic content 115 within an HTML page 111. As shown, the developer console 207 includes a tag creator 209 for registering tags for tagging dynamic content for caching.

Figure 5A:
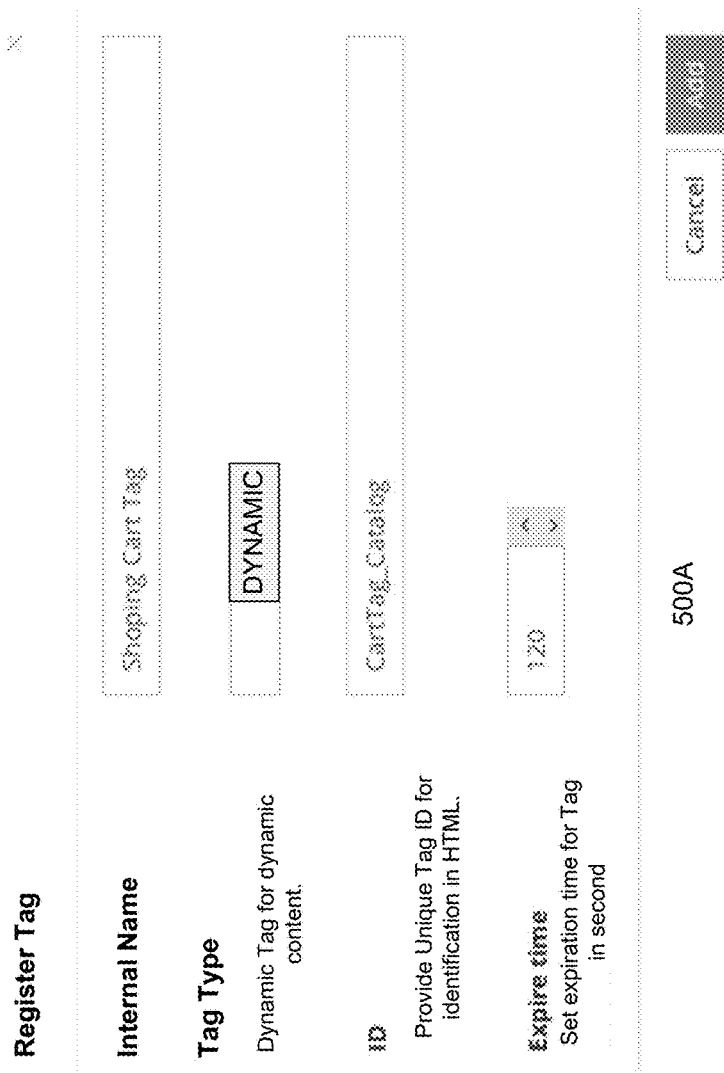
FIG. 5A illustrates an example user interface for creating a tag for dynamic content, according to one embodiment.

The tag creator 209 requests to add registration of one or more tags 117 with the proxy server 125 for dynamic content 115 within the page 111. For example, the tag creator 209 may request registration of a tag with a given ID and expiration time. The expiration time may be relatively short, e.g., in seconds or minutes, based on the frequency with which an updated version of the dynamic content 115 should be provided to the user. The tag creator 209 may additionally specify an internal name for the tag and select a tag type (in this case, a dynamic tag). An example interface showing the provided information is illustrated in FIG. 5A. For example, FIG. 5A illustrates an interface to register a tag including the option to specify the internal name "Shopping Cart Tag," select "DYNAMIC" for tag type, request the unique ID "CartTag_Catalog" and set an expiration time in seconds of "120." Once the administrator has provided the appropriate information, selecting "Add" generates a request to register the tag.

Once the tag creator 209 receives confirmation of tag 117 registration, dynamic content 115 within the page 111 can be tagged. Thus, when a user device (not shown) accesses the page 111, the dynamic content 115 wrapped with the tag 117 may be stored in the personalized cache 170 for servicing future requests received from the user device. Example code for a dynamic content (DC) tag 117 is illustrated below:

```
<head>
<!—page 111 header markup—>
</head>
<body>
<!—static 113 page 111 content here—>
<!—TAGID (117):BEGIN:DC_AREA_NAME:
COOKIE_NAME—>
Dynamic 115 page 111 content
<!—TAGID (117):END: DC_AREA_NAME:COOKIE_NAME—>
<!—static 113 page 111 content here—>
<!—page 111 footer markup—>
```

The tag creator 209 may also receive tag header response information for inclusion in origin server 160 responses associated with the tagged 117 dynamic content 115. For example, in instances where a user action or other activity would invalidate the dynamic content 115 (e.g., alter the dynamic content such that a cached version would no longer be valid) the tag header response information indicates to the proxy server 125 that dynamic content cached for the user under the specified tag is no longer valid and should be purged from the cache. Thus, the header of an origin server 160 response in an instance where dynamic content 115 is altered may include a header value (e.g., a tag identifier) indicating the tag 117 for the altered dynamic content. For example, if the dynamic content 115 is a shopping cart of the user, when the user adds or updates an item in the shopping cart, the origin server 160 confirms the change in a response to the user. The header information specified by the tag creator 209 included in the response identifies the dynamic content 115 (the shopping cart) that was altered by including the header value for the tag 117 wrapping the dynamic content 115 in the response—thus, the proxy server 125 can identify an outdated cached version of the dynamic content 115 in the personalized cache 170 for deletion.

Additionally, the tag creator 209 may specify rules for caching other content within the page 111, such a static content 113. For example, a rule name, expiration time for page 111 content, expiration time for user devices (browser expiration), and URLs to be cached (e.g., for the page 111 and/or static content 113) in the static cache 165 may be specified. Compared to the expiration time for dynamic content 115, the expiration time for other page content may be longer, e.g., in minutes, hours, days, based on the frequency the non-dynamic content is updated within the page. For example, a shopping site where offerings are changed infrequently may have a longer update time than a news site that frequently adds new content. FIG. 5B illustrates an example interface 500B for specifying some examples of the above caching rules.

The proxy server 125 may include a tag register 247 to receive the request for registering the dynamic content tag 117 and assign and/or confirm the unique tag ID for the dynamic content tag 117. The tag register 247 may also provide the insertion code for the dynamic content tag 117 and header information for responses associated with the tag.

Example System Components

Figure 3:
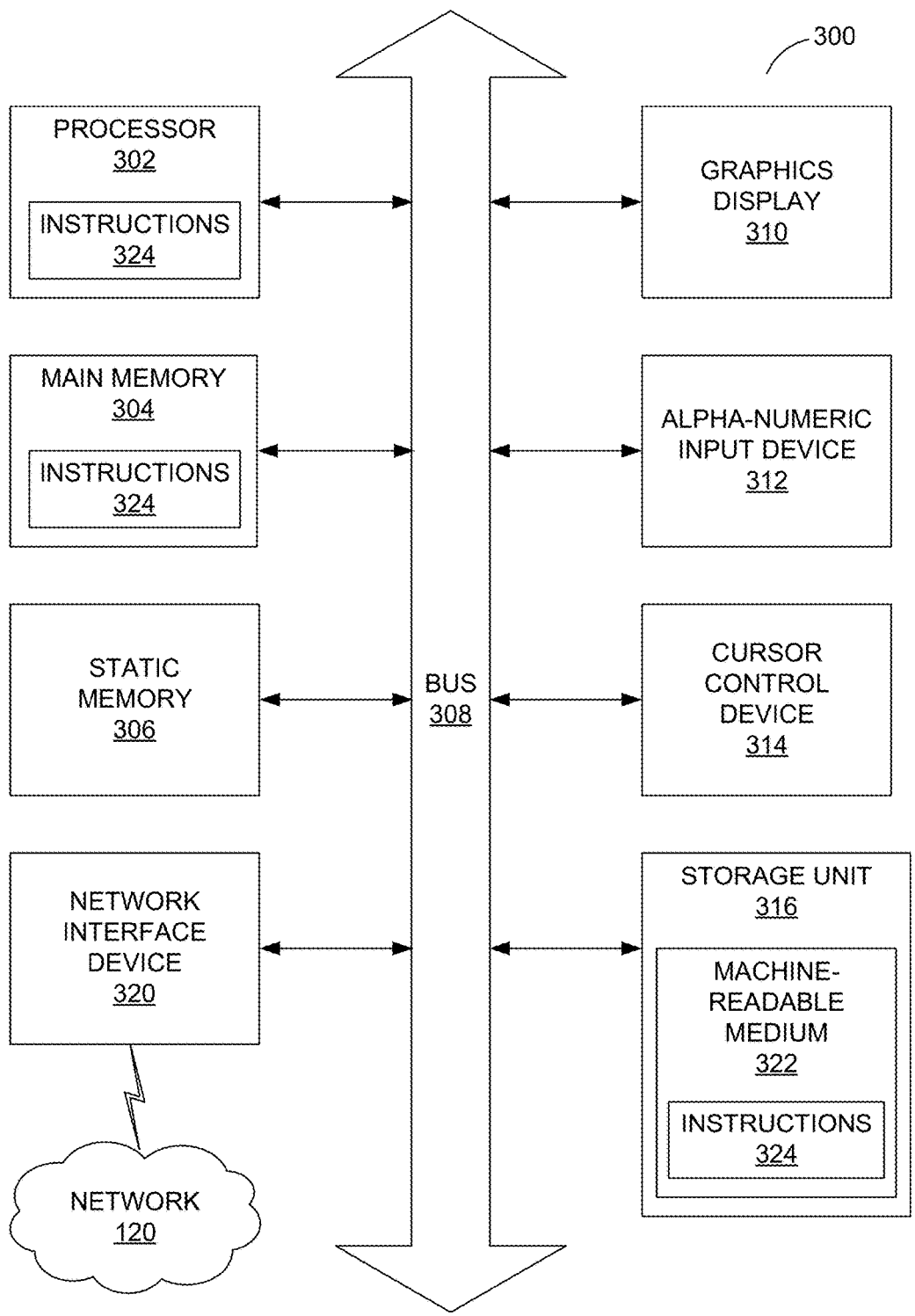
FIG. 3 illustrates an example architecture of a computing device, components of the architecture can corresponding to components in embodiments of computing devices such as the user device, developer console, origin server, proxy server, and/or caches.

FIG. 3 illustrates an example architecture of a computing device, components of the architecture can corresponding to components in embodiments of computing devices such as the user device, developer console, origin server, proxy server, and/or caches. As such, FIG. 3 illustrates components able to read instructions from a machine-readable medium and execute them on one or more processors (or controllers) to implement embodiments of the disclosed system for caching dynamic content specific to a user at the edge of a network, according to one embodiment. For example, user device 101, proxy server 125, developer console 207, static cache 165, personalized cache 170, and origin server 160 may include one or more of the components illustrated in FIG. 3. Specifically, FIG. 3 shows a diagrammatic representation of a machine in the example form of a computer system 300 within which instructions 324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processors 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or the like. The computer system 300 may also include alphanumeric input device 312 (e.g., a keyboard), a cursor control device 314 (e.g., a mouse, a trackball, a joystick, a motion sensor, or other pointing instrument), a storage unit 316, and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 120 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Example Page Request Handler

Figure 4:
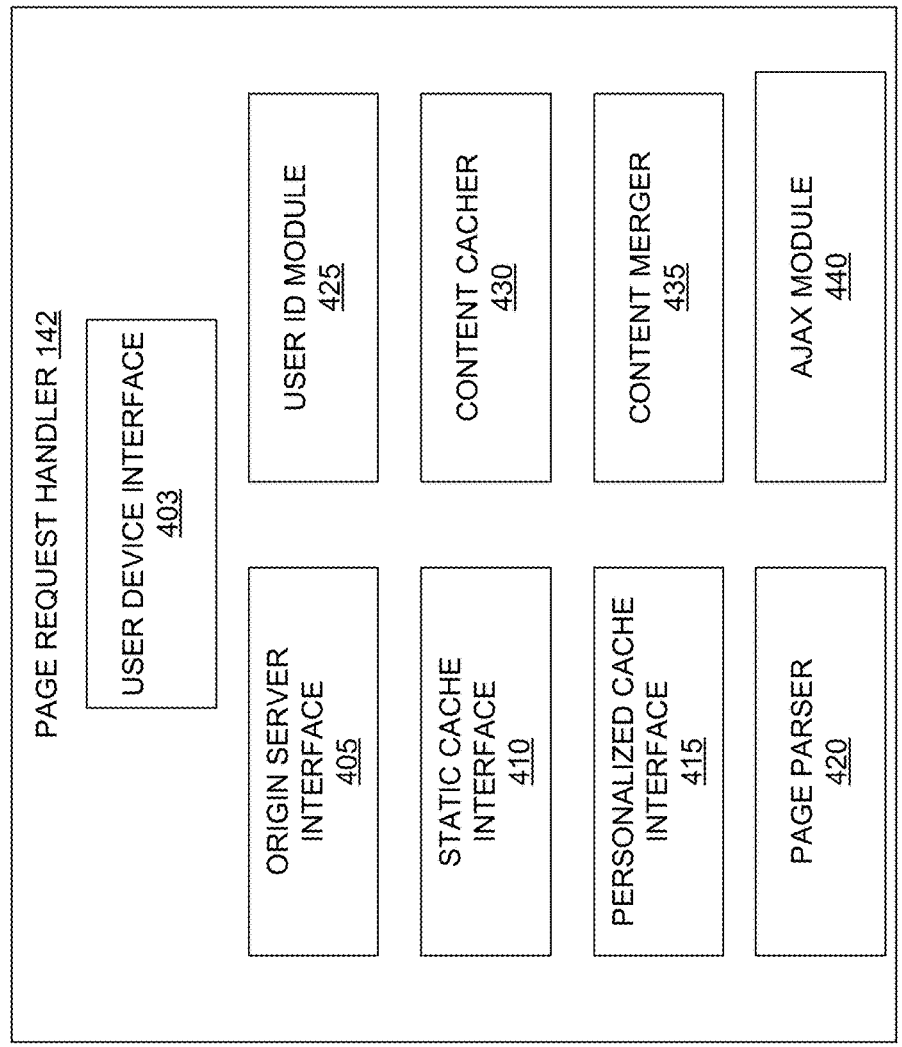
FIG. 4 illustrates a block diagram of a page request handler for servicing user device requests for online content, according to one embodiment.

FIG. 4 illustrates an example block diagram of a page request handler 142 for servicing user device requests for online content, according to one embodiment. As shown, the example page request handler 142 includes a user device interface 403, origin server interface 405, static cache interface 410, personalized cache interface 415, page parser 420, user ID module 435, content cacher 430, content merger 435, and AJAX module 440.

As described above, the page request handler 142 routes traffic between the user device 101 and the origin server 160, caches online content provided from the origin server 160 for the user device 101, and services user device 101 requests for online content that is stored in the cache.

The user device interface 403 provides a communication path between the user device and proxy server. Thus, for example, the user device interface 403 receives network traffic from the user device destined to the origin server and/or proxy server and transmits network traffic destined for the user device. Network traffic received at the user device interface 403 may include requests for online content at the origin server and user actions within the online content (e.g., traffic destined for the origin server). Network traffic received at the user device interface 403 may also include requests for updated dynamic content at the proxy server, such as an asynchronous JavaScript+XML (AJAX) request. Network traffic transmitted by the user device interface 403 may include origin server responses including the online content and responses to user actions within the online content. Network traffic transmitted by the user device interface 403 may also include proxy server responses including cached online content. The proxy server responses including cached online content may be provided by the user device interface 403 in response to either a request for online content at the origin server or request for updated dynamic content at the proxy server. In the latter case, the response may be provided as an AJAX response subsequent to receiving an AJAX request for updated dynamic content.

The origin server interface 405 provides a communication path between the proxy server and the origin server. Thus, the origin server interface 405 receives network traffic from the origin server destined for the user device and/or proxy server and transmits network traffic destined for the origin server. Network traffic transmitted by the origin server interface 405 may include requests initiated by the user device and routed by the proxy server for online content from the origin server and user actions within the online content (e.g., the traffic destined for the origin server). Network traffic transmitted by the origin server interface 405 may also include requests initiated by the proxy server for online content from the origin server. Network traffic received at the origin server interface 405 may include origin server responses to requests for online content (either initiated by the user device and routed by the proxy server or initiated by the proxy server) and origin server responses to user actions within the online content.

The static cache interface 410 provides a communication path between the proxy server and the static cache. The static cache interface 410 may store static content within the static cache and retrieve static content previously stored within the static cache.

In one embodiment, the static cache interface 410 may keep a record of static content stored in the static cache. For example, the static cache interface 410 may maintain a table including URLs (e.g., of an HTML page and/or online content) for which data has been stored in the static cache. In turn, the static cache interface 410 may be queried with a URL and subsequently retrieve cached data referenced by the URL from the static cache. Alternatively, if the URL does not exist in the table, the cache interface 410 indicates that no cached data exists for the URL in the static cache. The table may further include an expiration time for the URL, such that after the expiration time passes the static cache interface 410 purges cached data referenced by the URL. In other embodiments, the static cache may provide all or some of the above functionality.

The personalized cache interface 415 provides a communication path between the proxy server and the personalized cache. The personalized cache interface 415 may store dynamic content within the personalized cache and retrieve dynamic content previously stored within the personalized cache.

In one embodiment, the personalized cache interface 415 may keep a record of dynamic content stored in the personalized cache. For example, the personalized cache interface 415 may maintain a table including tag identifiers of dynamic content for which data has been stored in the static cache. Additionally, the table may include a user identifier associated with a tag identifier to indicate the user for which the dynamic content was stored. One result of this caching scheme is that dynamic content can span across multiple pages (e.g., with different URLs) based on the tag identifier and user identifier referencing the cached content and not a URL specific to one page. In a specific example, if dynamic content for a shopping cart of a user is received, the personalized cache interface 415 will cache the dynamic content in the personalization cache for future use and store a tag identifier and user identifier referencing that dynamic content and user. For example, the shopping cart may be referenced by tag identifier "Content Area: ShoppingCart" and the shopping cart of the specific user referenced by user identifier "Cookie Value: User=12345678abc54321." Thus, in the table, multiple entries may exist with a same tag identifier but with each entry having a different user identifier as the cached dynamic content may differ amongst the users. In turn, for a cache request, the personalized cache interface 415 may be queried with a tag identifier and user identifier and subsequently retrieve cached data referenced by the tag and user identifier from the personalized cache. Alternatively, if the tag and user identifier combination does not exist in the table, the cache interface 415 indicates that no cached data exists for the tag and user identifier in the personalized cache. The table may further include an expiration time for the tag identifier (specific to the user identifier tag identifier combination), such that after the expiration time passes the personalized cache interface 415 purges cached data referenced with the tag identifier and the user identifier. In other embodiments, the personalized cache, e.g., 170, may provide all or some of the above functionality.

The page parser 420 analyzes origin server responses to identify tagged and non-tagged content within the response. For example, if an origin server response includes HTML for a web page 111, the page parser 420 identifies dynamic content tags 117 within the web page. In one embodiment the page parser 420 may identify formatting of a tag 117 within the page and an associated tag identifier for the tag 117 for consulting a table containing registered tag identifiers to identify whether the tag 117 is registered for caching. The page parser 420 parses the dynamic content 115 (e.g., the HTML code and/or content) wrapped with the tags (e.g., those that are registered) from the page 111 for storage in the personalized cache. The page parser 420 may provide the tagged 117 dynamic content 115 parsed from the web page 111 and the associated tag identifier to the personalized cache interface for storage. The user ID module 425 may be called upon to provide a user identifier to the personalized cache interface 415 for the tagged 117 dynamic content 115 where the user identifier is specific to the user and/or user device that requested the web page including the tagged 117 dynamic content 115. Once the dynamic content 115 is parsed from the page 111, the page 111 includes only non-tagged content such as static content 113 and thus the page 111 may be stored in the static cache. The page parser 420 may provide the page 111 to the static cache interface 415 for storage.

In another example, the origin server response includes header information for tagged 117 dynamic content 115 that has been invalidated. The page parser 420 may identify formatting of the header indicating that dynamic content has been invalidated and one or more associated tag identifiers for the tag 117. The page parser 420 may provide the tag identifiers for the invalidated dynamic content to the personalized cache interface along with an instruction to purge the referenced dynamic content from the cache. The user ID module 425 may be called upon to provide a user identifier for the invalidated dynamic content to the personalized cache interface 415 such that only the referenced tagged 117 dynamic content 115 specific to the user is purged—as the dynamic content for other users need not be purged.

The user ID module 425 determines a user identifier for tagged 117 dynamic content 115 to be stored in the cache and/or purged from the cache. In one embodiment, the user identifier is a cookie name and/or cookie value specific to the user/user device determined from the formatting of a tag 117 within the page 111 and/or the header information. Alternatively, the user identifier may be determined from the response (or the associated request) based on the internet protocol (IP) address, media access control (MAC) address, etc. of the user device. The user ID module 425 provides the determined user identifier for tagged 117 dynamic content 115 to be stored within the personalized cache and/or purged from the cache to the personalized cache interface 415.

The content cacher 430 determines whether user device requests for online content on the origin server can be serviced with cached data or should be passed to the origin server for servicing. For example, the content cacher 430 identifies user device requests for web pages received at the origin server interface 405. For a particular request for a web page 111, the content cacher 430 determines whether there exists cached data for the web page by querying the static cache interface 410 with the URL of the web page. The static cache interface 410 may return static cached content for the web page from the static cache or indicate that no cached data exists for the web page. If no cached data exists for the web page, the content cacher 430 passes the user device request to the origin server interface 405 to route the user device request for online content to the origin server. The content cacher 430 similarly identifies requests from the user device for user actions within online content provided to the user device to pass the request to the origin server interface 405 for routing to the origin server. In turn, the content cacher 430 identifies an origin server response associated with the user device request and passes the request to the user device interface 403 to route the origin server response to the user device. The content cacher 430 may additionally instruct the page parser 420 to parse the response for caching and/or purging cached content.

If the static cache interface 410 returns static cached content for the web page from the static cache, the content cacher 430 identifies tag identifiers for the dynamic content that was parsed from the web page. The content cacher 430 may additionally identify a user identifier. The content cacher 430 may perform these operations in a similar fashion to the page parser 420. The content cacher 430 queries the personalized cache interface 415 with the tag identifiers and user identifier to retrieve any cached data from the personalized cache. The content cacher 430 passes retrieved cache data from the static cache and retrieved cache data from the personalized cache to the content merger 435.

The content merger 435 assembles a cached version of the web page from received cached data. The content merger 435 identifies the tags for dynamic content within the page, e.g., from the static version of the page and/or static content stored in the static cache. If the content merger 435 also received dynamic content for a particular tag, the content merger 435 inserts the dynamic content. If dynamic content was not received for a tag, the content merger 435 inserts a placeholder such as code for the user device to request the missing dynamic content from the proxy server, e.g., after receiving a partially assembled cached version of the web page. For example, the content merger 435 may insert AJAX code in place of the missing dynamic content to initiate the request for the dynamic content. The inserted code for the request includes the tag identifier and user identifier. One example request may include "/get_content/tagID/userID". In turn, the user device will receive and merge the requested missing dynamic content for display (e.g., through Dynamic HTML). In some embodiments, the inserted code includes a placeholder indication that the content is being requested for updating.

If dynamic content was received for all tags, the content merger 435 fully assembles the cached version of the web page and generates a response for providing the (fully) cached version of the web page to the user device. As can be seen in this instance, the user device request is wholly serviced with cached content by the proxy server, thus communication with the origin server for the request would be superfluous.

If dynamic content was not received for all tags, the content merger 435 partially assembles the cached version of the web page and generates a response for providing the partially cached version of the web page to the user device. In order to wholly fulfill the request from the user device for the whole web page, the missing dynamic content may be retrieved from the origin server. For example, to retrieves the missing dynamic content in the partially assembled cached version of the web page, the content merger may pass the user device request on to the origin server interface 405 for transmission to the origin server. In some embodiments, the content merger 435 modifies the request such that the origin server response is directed to the proxy server rather than the user device. In other embodiments, the content merger 435 instructs the origin server interface 405 to intercept the origin server response associated with the passed request to prevent routing to the user device. In either instance, the origin server response is provided to the page parser 420 for processing, which results in the caching of updated dynamic content for the requested web page in the personalized cache 415.

The AJAX module 440 receives requests for missing dynamic content in partially cached versions of web pages provided to user devices and generates responses including the missing dynamic content once updated dynamic content received from the origin server has been stored in the personalized cache. The request includes a tag identifier for missing dynamic content and a user identifier. The AJAX module 440 queries the personalized cache interface 415 to retrieve updated dynamic content referenced by the tag identifier and the user identifier. Once the AJAX module 440 retrieves the updated dynamic content, the AJAX module 440 constructs a response including the updated dynamic content, which the user device may then insert to display the updated dynamic content.

Example Servicing of User Device Requests

FIGS. 6A, 6B, 6C, and 6D illustrate example event traces for servicing user requests for online content including tagged dynamic content, according to various embodiments.

Figure 6A:
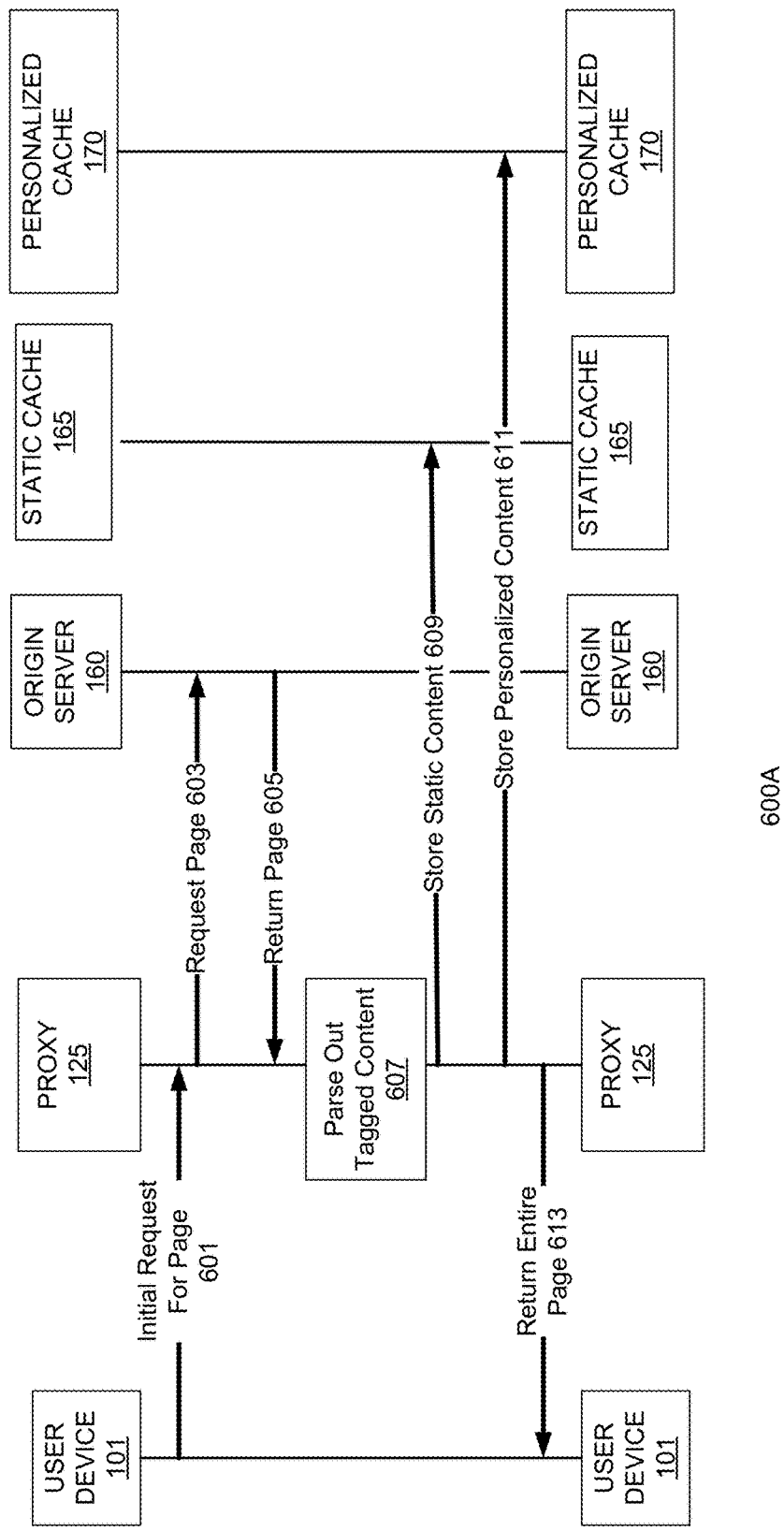
FIGS. 6A, 6B, 6C, and 6D illustrate example event traces for servicing user requests for online content including tagged dynamic content, according to various embodiments.

Referring first to FIG. 6A, which illustrates an event trace 600A for an initial page request, a user device 101, proxy server 125, origin server 160, static cache 165, and personalized cache 170 are shown. The proxy server 125 receives an initial request 601 for online content such as a web page including tagged dynamic content from a user device 101. The online content originates from an origin server 160 and may include static content and dynamic content. An example of online content is a web page including images, text, audio, video, etc. Examples of static content include image, text, audio, video, etc. in a web page that are not user specific—such as those included in an article, gallery, homepage, etc. that are not personalized. Examples of dynamic content include images, text, audio, video, etc. in a web page that are user specific—such as those included in a shopping cart, recommendation, advertisement, and account information specific (or personalized) for the user on the web page. Dynamic content within the web page is wrapped with a dynamic content tag registered with the proxy server 125.

For an initial request 601 of the online content (e.g., a web page with dynamic content and static content) received from the user device, the proxy server 125 determines none of the requested online content is identified in a cache. In turn, the proxy server 125 routes the request for the web page 603 to the origin server 160 and receives a response 605 from the origin server 160 including the content of the requested web page. The proxy server 125 may then provide a response 613 including the content of the requested web page to the user device 613. In order to service subsequent requests with cached content and having retrieved the contents of requested page from the origin server 160, the proxy server 125 parses 607 out tagged dynamic content within the web page and stores the remaining static web page content 609 within the static cache 165. A request identifier such as a URL of the web page specific to the request 601/603 is stored for referencing the cached static content in the static cache 165. The proxy server 125 stores the parsed out dynamic content 611 within the personalized cache 170. Tag identifiers for the tagged dynamic content are stored for referencing the cached dynamic content in the personalized cache 170. A user identifier specific to the user/user device included in the request and/or response may also be stored for refereeing the cached dynamic content specific to the user.

Figure 6B:
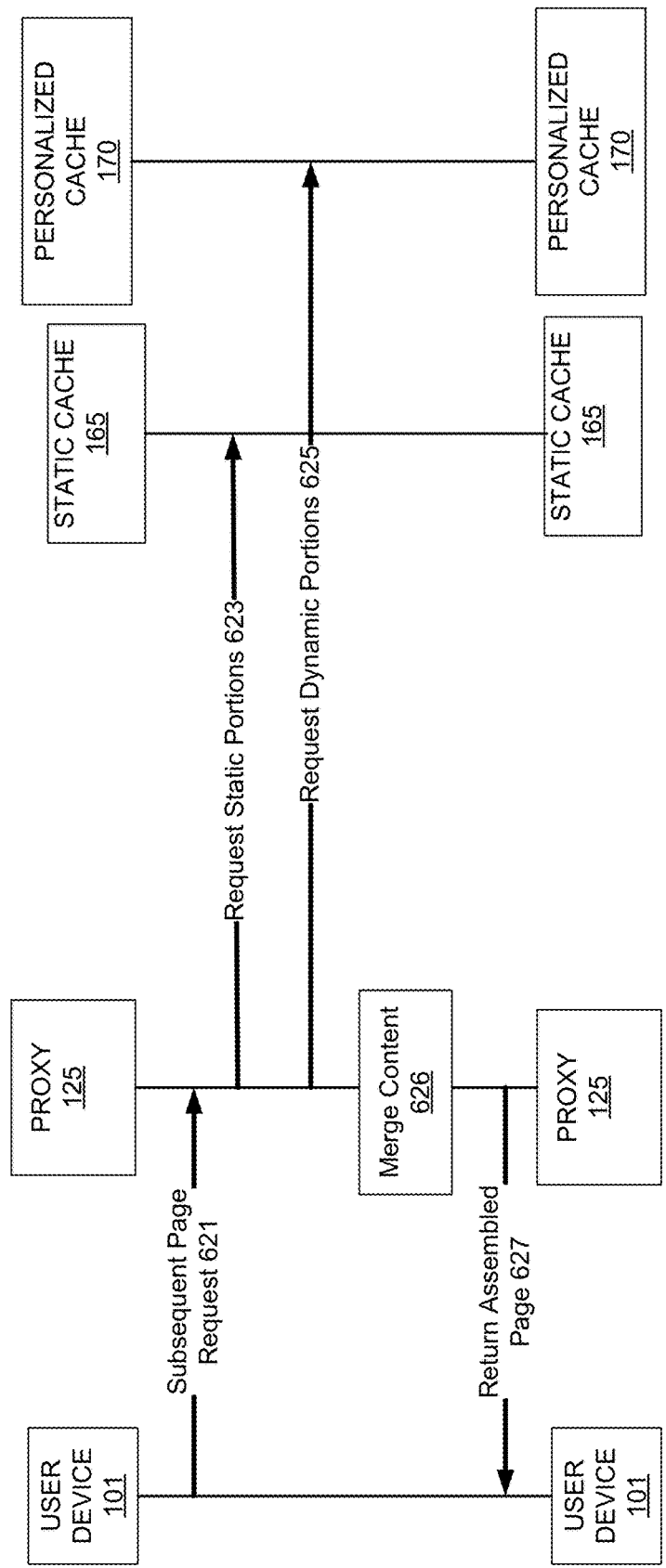

Referring now to FIG. 6B, which illustrates an event trace 600B for a subsequent page request, a user device 101, proxy server 125, static cache 165, and personalized cache 170 are shown. The origin server is omitted in the example of FIG. 6B for a subsequent page request fully serviced from cached content.

For a subsequent request 621 of the web page received from the user device at the proxy server 125, static content for the static portions of the web page is requested 623 from the static cache 165 and dynamic content for the dynamic portions of the web page is requested 625 from the personalized cache 170.

In one embodiment, the proxy server 125 determines whether a request identifier, e.g., URL for the requested page, exists for the request (i.e., static content for the request exists in the static cache), and then requests 623 the cached static content referenced by the URL from the static cache. The cached static content received from the static cache 165 includes one or more tag identifiers for the dynamic content within the requested web page and the subsequent request 621 itself and/or cached static content includes one or more user identifiers. In one embodiment, the proxy server 125 determines whether a tag identifier and user identifier association exists (i.e., dynamic content for servicing the request 621 has been stored in the personalized cache 170) and, in turn, requests the cached portions of the dynamic content 625 referenced by the tag identifier and user identifier from the personalized cache 170.

The proxy server 125 merges 626 the returned cached dynamic content with the returned cached static content to assemble a cached version of the online content in the web page requested 621 by the user device. For example, the proxy server 125 inserts, for each tag identifier in the cached static content, the cached dynamic content referenced by a given tag identifier and the user identifier to assemble the cached version of the online content. The proxy server 125 then returns the cached version of the web page 627 including both the cached static content and the cached dynamic content to the user device 101.

Figure 6C:
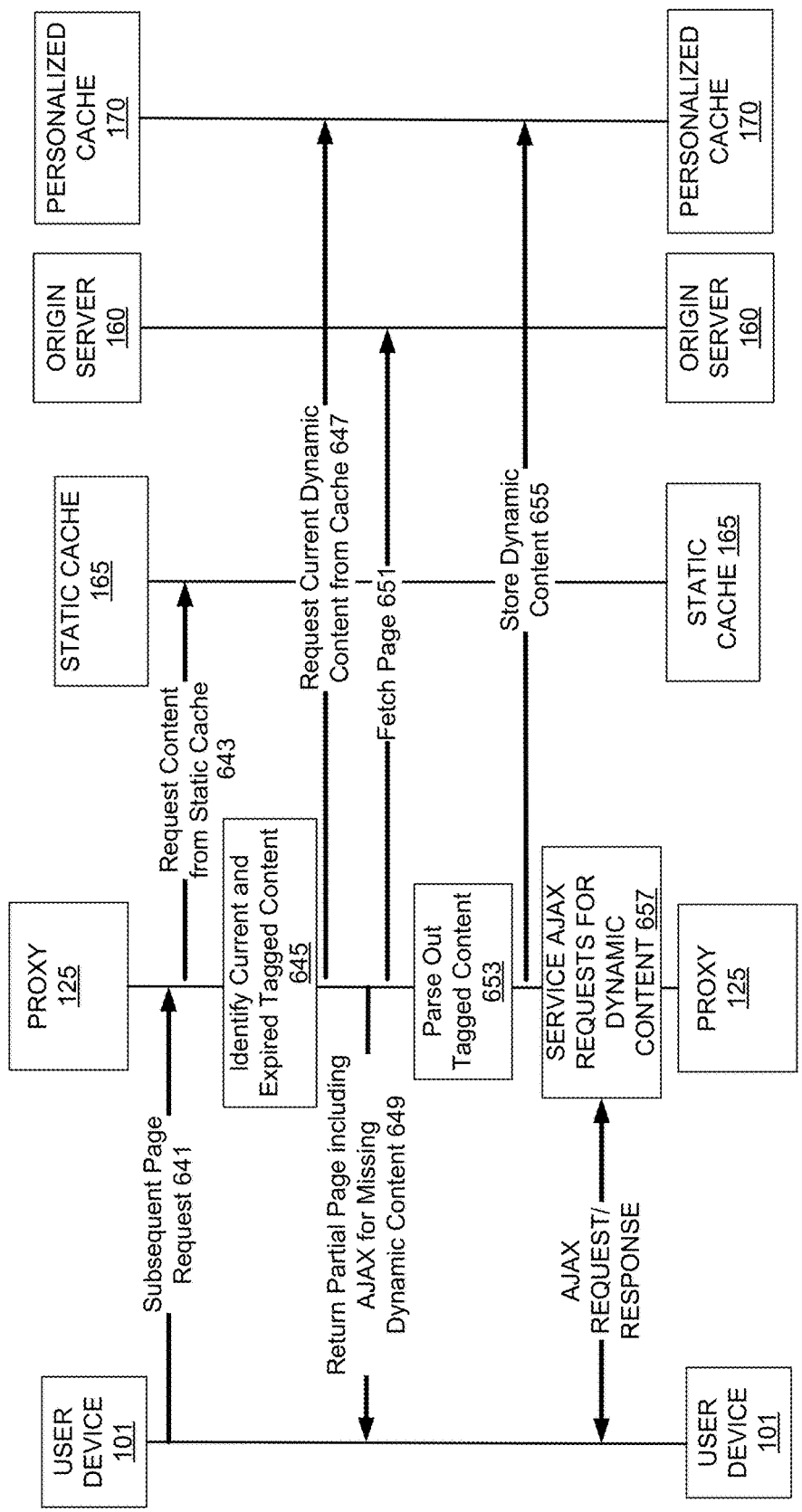

Referring now to FIG. 6C, which illustrates an event trace 600C for a subsequent page request partially serviced from cached content, a user device 101, proxy server 125, static cache 165, personalized cache 170, and origin server 160 are shown.

In some instances, for a subsequent request 641, the personalized cache 170 may not wholly contain all the cached dynamic content necessary to fully assemble the online content within a web page. In other words, a first portion of the dynamic content necessary to fully assemble the requested web page may not exist in the personalized cache or be outdated while a second portion of the dynamic content necessary to fully assemble the requested web page does exist in the personalized cache.

The proxy server 125 requests 643 the static content for the web page from the static cache 165. The proxy server 125 identifies 645 current and expired/missing tagged dynamic content in the web page. Current dynamic content is retrieved 647 from the personalized cache 170 and merged with the static content. For missing dynamic content not retrieved from the personalized cache, AJAX code that causes the user device 101 to request the missing dynamic content from the proxy server 125 is inserted in place of the missing dynamic content. The result is a partially cached version of the web page including the AJAX code for the missing dynamic content. The partially cached version of the web page is transmitted 649 to the user device 101.

The proxy server 125 routes the subsequent page request 641 to the origin server 160 to fetch the web page 651 and thus updated dynamic content for the missing/expired dynamic content that was not included (and replaced with AJAX code) in the partially cached version of the web page provided to the user device 101. The proxy server 125 receives the origin server response to the request 651 and parses 653 out the tagged dynamic content, which is stored 655 in the personalized cache 170 and can be referenced by a tag identifier and user identifier, as in the prior examples.

The proxy server 125 services 657 AJAX requests received from the user device 101 for the missing dynamic content (in the partial page 649). An example AJAX request includes a tag identifier and user identifier such that the proxy server 125 can reference the updated dynamic content stored in the personalized cached. In turn, once the updated dynamic content becomes available in the personalized cache 170 (e.g., when the proxy server 125 stores the updated dynamic content 655), the proxy server generates an AJAX response including the referenced updated dynamic content and transmits the AJAX response to the user device 101. The user device 101 receives the AJAX response including the updated dynamic content for the missing portions of dynamic content in the partial page and updates the partially cached version of the web page (e.g., through DHTML) to display the updated dynamic content, and thus, a full version of the web page.

Figure 6D:
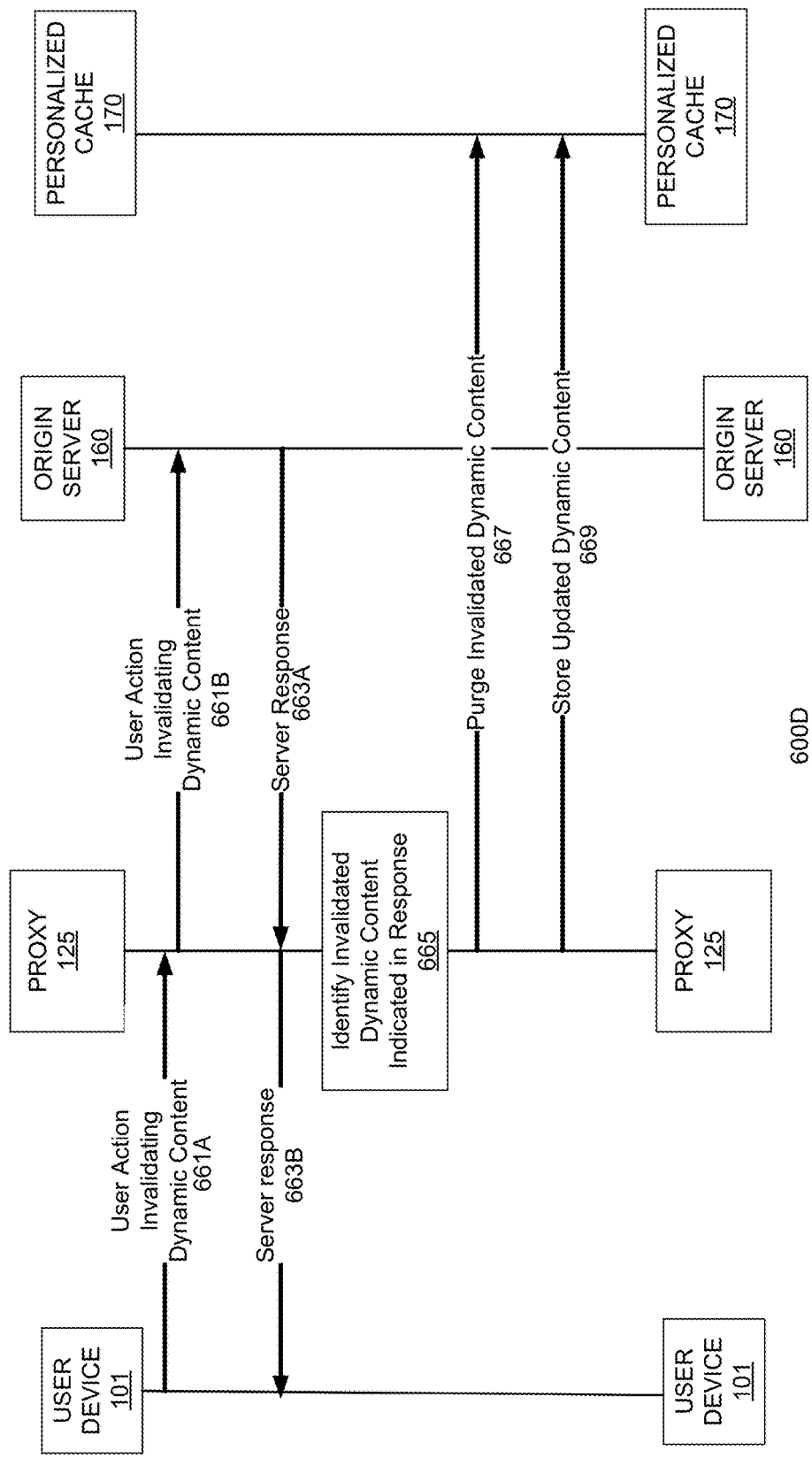

Referring now to FIG. 6D illustrating an event trace 600D for a user action invalidating dynamic content, a user device 101, proxy server 125, personalized cache 170, and origin server 160 are shown. The static cache is omitted in the example of FIG. 6D because only the personalized cache 170 includes content invalidated in this example.

The user may perform actions through their user device 101 within received online content (including cached dynamic content) that invalidate the cached version of the dynamic content. For example, the user may update account details, add or update an item in a shopping cart, etc. When the user performs an action within received online content such as a web page, a request 661A associated with the action is received at the proxy server and passed 661B on to the origin server 160. The origin server 160 performs whatever operations are necessary for the user and generates a response 663A which the proxy server 125 then passes 663B to the user device 101. The origin server 160 further determines whether the action invalidated any dynamic content and includes one or more tag identifiers in the response 663A for the invalidated dynamic content to indicate to the proxy server 125 that cached dynamic content having those tags identifiers is invalid.

In one embodiment, the proxy server 125 receives the response and identifies 665 whether the personalized cache 170 includes dynamic content referenced by the tag identifiers for invalidated dynamic content in the response 663A. If the personalized cache 170 includes dynamic content referenced by the tag identifiers for invalidated dynamic content, the referenced dynamic content is purged 667 from the personalized cache. Additionally, the proxy server 125 may determine a user identifier for the user/user device 101, as described previously. In this way, the user identifier and tag identifier combination may be used to reference only the cached dynamic content specific to the user under a given tag identifier for purging. Further, if the response from the origin server 160 includes tag references for dynamic content that is not invalid (either new or updated dynamic content in the response 663A), the proxy server 125 parses the response to cache 669 the updated dynamic content in the personalized cache 170.

Example Registration for Dynamic Content Caching

Figure 7:
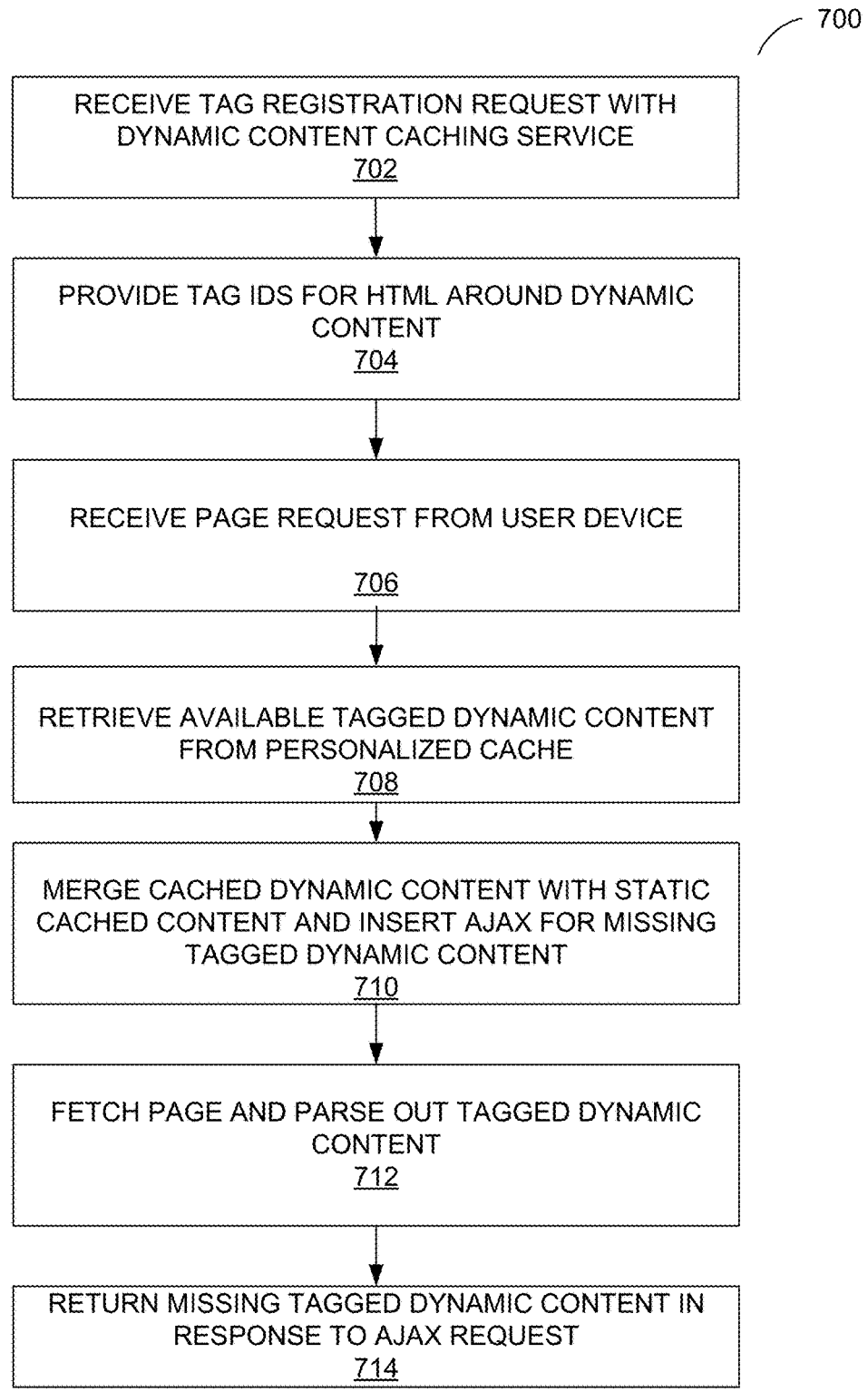
FIG. 7 illustrates an example method of registering tags for servicing user requests for online content including tagged dynamic content, according to one embodiment.

FIG. 7 illustrates an example method of registering tags for servicing user requests for online content including tagged dynamic content, according to one embodiment. The proxy server receives 702 a tag registration request with a dynamic content caching service. For example, a developer console of a web page administrator may request to register a tag with the proxy server for caching dynamic content within the website. The registration request may specify a tag identifier 704 that uniquely identifies the tag which the proxy server verifies as unique. In other embodiments, the proxy server may assign a tag identifier based on the request. In either instance, the proxy server stores the tag identifier. The proxy server may provide instructions and/or code to the developer console such that the web page administrator can wrap dynamic content with code including the tag identifier to create tagged dynamic content within the web page. Additionally, the proxy server may provide instructions and/or code to the developer consoled for including in responses (e.g., in a header) associated with changes to the tagged dynamic content, i.e., a response to an action that invalidates the dynamic content wrapped by the tag.

In turn, the proxy server may receive a request 706 from a user device for the web page including tagged dynamic content that was cached in a personalized cache. The proxy server retrieves 708 available cached dynamic content that was tagged within the web page from the personalized cache. The cached dynamic content is merged 710 with cached static content to assemble a cached version of the web page. For any tagged dynamic content within the web page does not exist in the personalized cache or has expired (i.e., missing) placeholders are inserted in the cached version of the web page for the missing dynamic content to request updated dynamic content for the missing dynamic content and then insert the updated dynamic content received from the proxy server at the user device to fill in the missing dynamic content. The cached version of the web page, which may include one or more placeholders, is provided to the user device. If any tagged dynamic content within the web page did not exist in the personalized cache, the proxy server fetches 712 the web page from an origin server of the web page and parses out the tagged dynamic content to populate the personalized cache with updated dynamic content. The proxy server receives a placeholder request for the missing dynamic content from the user device and returns 714 the updated dynamic content stored in the personalized cached referenced by the placeholder to the user device.

Figure 8:
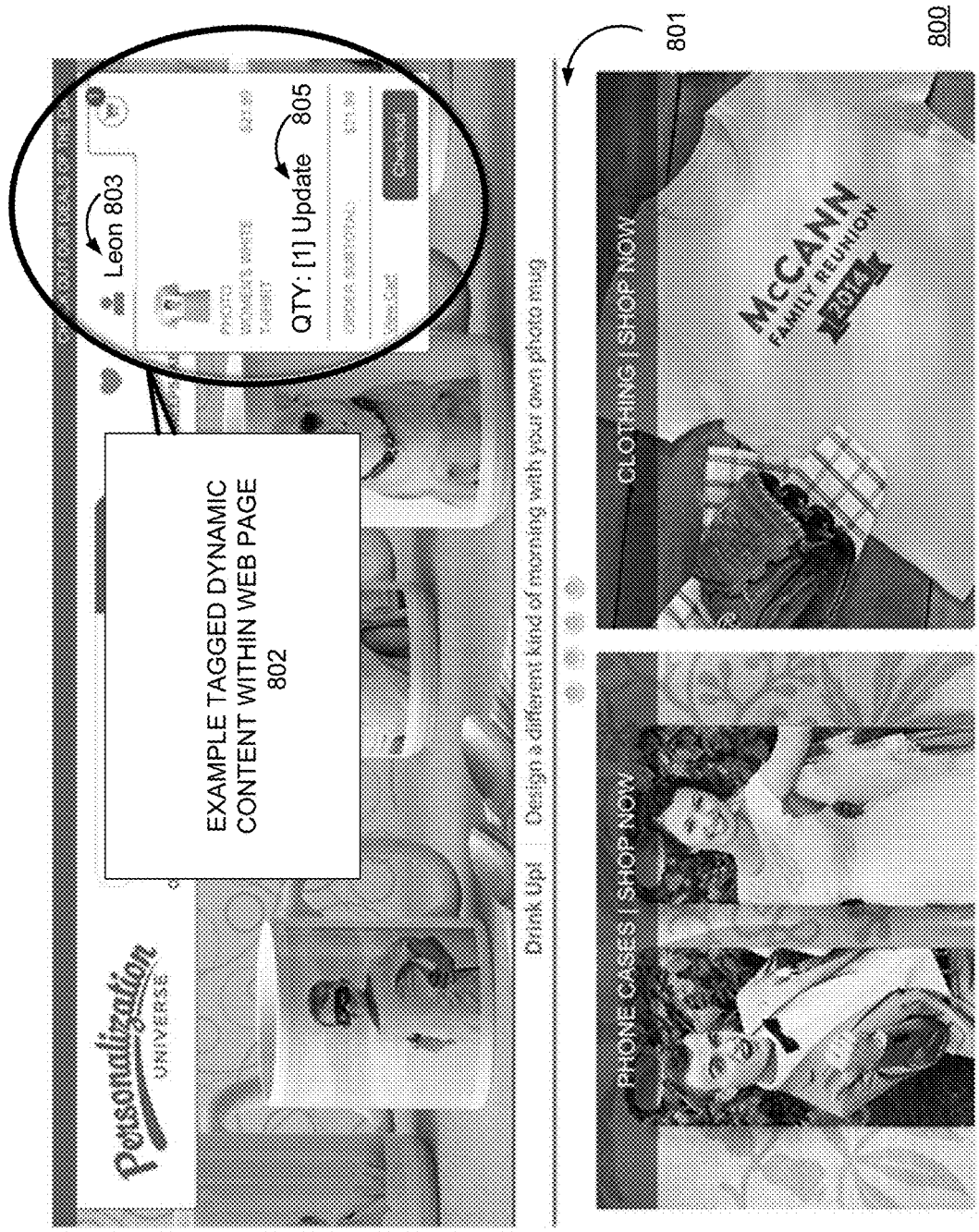
FIG. 8 illustrates an example web page displayed on a user device including tagged dynamic content, according to one embodiment.

FIG. 8 illustrates an example web page 800 displayed on a user device including tagged dynamic content 802, according to one embodiment. As shown in FIG. 8, a user 803 is logged into an ecommerce web page 800. Example dynamic content 802 within an ecommerce web page personalized for the user may include a shopping cart. Example static content 801 within the ecommerce web page may include the services/products available for purchase and/or other content. In one example for an HTML ecommerce web page 800, to create the tagged dynamic content 802, the portion of HTML corresponding to the shopping cart within the HTML of the web page 800 is wrapped with a dynamic tag including a tag identifier. A user identifier may be included for the user 803 in the HTML provided to the specific user. An example user action resulting in the invalidation of tagged dynamic content 802 in the illustrated example can include a user action to update 805 a quantity of an item in the shopping cart.

Additional Configuration Considerations

Through use of a system, method, and computer readable storage medium storing computer program instructions for registering dynamic content within a web page and caching dynamic content specific to a user at the edge of a network, dynamic content in addition to static content can be cached. Thus, by implementing proxy servers similar to those described herein around the edges of the network proximate to user access points, round trip times of the request/response path for online content delivered to a user device, including those for current dynamic content, can be reduced. Further, stress on the interior of the network may be reduced as data needs to be fetched less often from the origin server for the user device as current dynamic content can span multiple web pages.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms such as the page request handler, tag creator, tag register, static cache, dynamic cache, etc. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 302) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 6A-C and FIG. 7) described herein may be performed, at least partially, by one or more processors (e.g., processor 302) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 304). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system, method, and computer readable storage medium storing computer program instructions for registering dynamic content within a web page and caching dynamic content specific to a user as the edge of a network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for caching dynamic content comprising:
receiving a web page including online content;
parsing out dynamic content from static content within the online content of the web page, the dynamic content identified by one or more dynamic content tags within the web page;
storing the static content of the web page within a static cache;
storing the parsed out dynamic content of the web page within a personalized cache;
retrieving, in response to receiving a request for the web page, the static content of the web page from the static cache;
identifying the one or more dynamic content tags within the web page from the retrieved static content;
retrieving, from the personalized cache, the dynamic content of the web page corresponding to the one or more dynamic content tags;
merging the dynamic content and the static content to assemble a cached version of the web page; and
transmitting the cached version of the web page responsive to the request for the web page.

2. The method of claim 1, wherein the cached version of the web page is a partially cached version of the web page, the partially cached version of the web page including a first portion of dynamic content corresponding to a first dynamic content tag in the one or more dynamic content tags and missing a second portion of dynamic content corresponding to a second dynamic content tag in the one or more dynamic content tags, the method further comprising, in response to receiving the request for the web page:
inserting a placeholder for the second portion of dynamic content within the partially cached version of the web page; and
wherein transmitting the cashed version of the web page responsive to the request for the web page comprises transmitting the partially cached version of the web page.

3. The method of claim 2, further comprising:
requesting a current version of the web page from an origin server, the current version of the web page including updated dynamic content;
parsing out the updated dynamic content from the static content of the web page, the updated dynamic content identified by the one or more dynamic content tags within the web page and including a portion of updated dynamic content corresponding to the second dynamic content tag; and
storing the parsed out updated dynamic content of the web page within the personalized cache.

4. The method of claim 3, further comprising:
receiving a request for updated dynamic content corresponding to the second dynamic content tag; and
transmitting the portion of the updated dynamic content corresponding to the second dynamic content tag responsive to the request for updated dynamic content.

5. The method of claim 4, wherein the placeholder causes a user device to request the updated dynamic content for the second portion of dynamic content missing from the partially cached version of the web page.

6. The method of claim 5, wherein storing the parsed out dynamic content comprises storing a reference to the dynamic content stored in the personalized cache in association with an identifier for the user device.

7. The method of claim 6, wherein retrieving, from the personalized cache, the dynamic content of the web page corresponding to the one or more dynamic content tags comprises:
requesting dynamic content from the personalized cache based on the association of the reference and the identifier for the user device.

8. A non-transitory computer-readable medium comprising stored instructions that when executed by a processor cause the processor to:
receive a web page including online content;
parse out dynamic content from static content within the online content of the web page, the dynamic content identified by one or more dynamic content tags within the web page;
store the static content of the web page within a static cache;

store the parsed out dynamic content of the web page within a personalized cache;
retrieve, in response to receiving a request for the web page, the static content of the web page from the static cache;
identify the one or more dynamic content tags within the web page from the retrieved static content;
retrieve, from the personalized cache, the dynamic content of the web page corresponding to the one or more dynamic content tags;
merge the dynamic content and the static content to assemble a cached version of the web page; and
transmit the cached version of the web page responsive to the request for the web page.

9. The non-transitory computer-readable medium of claim 8, wherein the cached version of the web page is a partially cached version of the web page, the partially cached version of the web page including a first portion of dynamic content corresponding to a first dynamic content tag in the one or more dynamic content tags and missing a second portion of dynamic content corresponding to a second dynamic content tag in the one or more dynamic content tags, the non-transitory computer readable medium further comprising instructions that cause the processor, in response to receiving the request for the web page, to:
insert a placeholder for the second portion of dynamic content within the partially cached version of the web page, wherein the instructions to transmit the cached version of the web page responsive to the request for the web page further comprises instructions to transmit the partially cached version of the web page.

10. The non-transitory computer-readable medium of claim 9, further comprising instructions that cause the processor to:
request a current version of the web page from an origin server, the current version of the web page including updated dynamic content;
parse out the updated dynamic content from the static content of the web page, the updated dynamic content identified by the one or more dynamic content tags within the web page and including a portion of updated dynamic content corresponding to the second dynamic content tag; and
store the parsed out updated dynamic content of the web page within the personalized cache.

11. The non-transitory computer-readable medium of claim 10, further comprising instructions that cause the processor to:
receive a request for updated dynamic content corresponding to the second dynamic content tag; and
transmit the portion of the updated dynamic content corresponding to the second dynamic content tag responsive to the request for updated dynamic content.

12. The non-transitory computer-readable medium of claim 11, wherein the placeholder causes a user device to request the updated dynamic content for the second portion of dynamic content missing from the partially cached version of the web page.

13. The non-transitory computer-readable medium of claim 12, wherein the instructions to store the parsed out dynamic content further comprises instructions that cause the processor to store a reference to the dynamic content stored in the personalized cache in association with an identifier for the user device.

14. The non-transitory computer-readable medium of claim 13, wherein the instruction to retrieve, from the personalized cache, the dynamic content of the web page corresponding to the one or more dynamic content tags further comprises instructions that cause the processor to:
request dynamic content from the personalized cache based on the association of the reference and the identifier for the user device.

15. A system for caching dynamic content, the system comprising:
a processor; and
a non-transitory computer-readable medium comprising instructions that when executed by the processor cause the processor to:
receive a web page including online content;
parse out dynamic content from static content within the online content of the web page, the dynamic content identified by one or more dynamic content tags within the web page;
store the static content of the web page within a static cache;
store the parsed out dynamic content of the web page within a personalized cache;
retrieve, in response to receiving a request for the web page, the static content of the web page from the static cache;
identify the one or more dynamic content tags within the web page from the retrieved static content;
retrieve, from the personalized cache, the dynamic content of the web page corresponding to the one or more dynamic content tags;
merge the dynamic content and the static content to assemble a cached version of the web page; and
transmit the cached version of the web page responsive to the request for the web page.

16. The system of claim 15, wherein the cached version of the web page is a partially cached version of the web page, the partially cached version of the web page including a first portion of dynamic content corresponding to a first dynamic content tag in the one or more dynamic content tags and missing a second portion of dynamic content corresponding to a second dynamic content tag in the one or more dynamic content tags, the non-transitory computer-readable medium further comprising instructions that cause the processor to, responsive to receiving the subsequent request for the web page from the user device:
insert a placeholder for the second portion of dynamic content within the partially cached version of the web page, wherein the instructions to transmit the cached version of the web page responsive to the request for the web page comprises instructions to transmit the partially cached version of the web page.

17. The system of claim 16, wherein the non-transitory computer-readable medium further comprises instructions that cause the processor to:
request a current version of the web page from an origin server, the current version of the web page including updated dynamic content;
parse out the updated dynamic content from the static content of the web page, the updated dynamic content identified by the one or more dynamic content tags within the web page and including a portion of updated dynamic content corresponding to the second dynamic content tag; and
store the parsed out updated dynamic content of the web page within the personalized cache.

18. The system of claim 17, wherein the non-transitory computer-readable medium further comprises instructions that cause the processor to:

receive a request for updated dynamic content corresponding to the second dynamic content tag; and transmit the portion of the updated dynamic content corresponding to the second dynamic content tag responsive to the request for updated dynamic content.

19. The system of claim 18, wherein the placeholder causes a user device to request the updated dynamic content for the second portion of dynamic content missing from the partially cached version of the web page.

20. The system of claim 19, wherein the instructions to store the parsed out dynamic content comprises further comprises instructions that cause the processor to store a reference to the dynamic content stored in the personalized cache in association with an identifier for the user device and wherein the instructions to retrieve, from the personalized cache, the dynamic content of the web page corresponding to the one or more dynamic content tags further comprises instructions that cause the processor to request dynamic content from the personalized cache based on the association of the reference and the identifier for the user device.

* * * * *